United States Patent
Lu et al.

(10) Patent No.: US 9,626,052 B2
(45) Date of Patent: Apr. 18, 2017

(54) TOUCH PANEL

(71) Applicants: Chun-Cheng Lu, Taichung (TW);
Chia-Ching Lu, Taichung (TW);
Chin-Chang Liu, Taichung (TW);
Ting-Yu Chang, Kaohsiung County (TW); Wen-Chun Wang, Taichung (TW)

(72) Inventors: Chun-Cheng Lu, Taichung (TW);
Chia-Ching Lu, Taichung (TW);
Chin-Chang Liu, Taichung (TW);
Ting-Yu Chang, Kaohsiung County (TW); Wen-Chun Wang, Taichung (TW)

(73) Assignee: WINTEK CORPORATION, Taichung (TW)

( * ) Notice: Subject to any disclaimer, the term of this patent is extended or adjusted under 35 U.S.C. 154(b) by 128 days.

(21) Appl. No.: 14/488,289

(22) Filed: Sep. 17, 2014

(65) Prior Publication Data
US 2015/0075959 A1    Mar. 19, 2015

(30) Foreign Application Priority Data

Sep. 17, 2013  (TW) .............................. 102217507 U

(51) Int. Cl.
*H01H 13/70* (2006.01)
*H01H 25/00* (2006.01)
(Continued)

(52) U.S. Cl.
CPC ............ *G06F 3/044* (2013.01); *G06F 3/0416* (2013.01); *G06F 2203/04108* (2013.01)

(58) Field of Classification Search
CPC .. G09G 5/12; G09G 2356/00; G09G 2370/16;
G09G 2354/00; G06F 3/0416; G06F
3/044; G06F 2203/04108; H01H 1/00;
H01H 13/70; H01H 13/702–13/704;
H01H 2239/074; H01H 2203/008; H01H
2207/01; H01H 2221/00; H01H
2231/002; H01H 2231/012; H01H
2231/016; H01H 2231/052; H01H
2239/006; H01H 25/00; H01H 25/04
(Continued)

(56) References Cited

U.S. PATENT DOCUMENTS

2010/0301879 A1* 12/2010 Philipp .................. G06F 3/044
324/679
2011/0304578 A1* 12/2011 Kim ....................... G06F 3/044
345/174
(Continued)

*Primary Examiner* — Anthony R. Jimenez
(74) *Attorney, Agent, or Firm* — Jianq Chyun IP Office

(57) ABSTRACT

A touch panel including a touch area and a peripheral area adjacent to the touch area is provided. The touch panel includes a plurality of first electrodes, a plurality of second electrodes, a plurality of third electrodes, a plurality of pads and a plurality of wirings. The first electrodes, the second electrodes and the third electrodes are located in the touch area and electrically insulated to each other, wherein the third electrodes expose at least a part of the first electrodes and at least a part of the second electrodes. The pads are located in the peripheral area. The first electrodes, the second electrodes and the third electrodes are electrically connected to the pads through the wirings respectively.

31 Claims, 14 Drawing Sheets

(51) Int. Cl.
*H01H 25/04* (2006.01)
*G06F 3/044* (2006.01)
*G06F 3/041* (2006.01)

(58) Field of Classification Search
USPC ............. 200/5 R, 600, 181; 345/173; 349/12
See application file for complete search history.

(56) References Cited

U.S. PATENT DOCUMENTS

2013/0300691 A1* 11/2013 Huang .................... G06F 3/044
345/173
2014/0043546 A1* 2/2014 Yamazaki ........... G02F 1/13338
349/12
2015/0015806 A1* 1/2015 Wu ......................... G06F 3/044
349/12

* cited by examiner

TOUCH PANEL

CROSS-REFERENCE TO RELATED APPLICATION

This application claims the priority benefit of Taiwan application serial no. 102217507, filed on Sep. 17, 2013. The entirety of the above-mentioned patent application is hereby incorporated by reference herein and made a part of this specification.

BACKGROUND

Technical Field

The invention relates to a panel. Particularly, the invention relates to a touch panel.

Related Art

In recent years, touch electronic products are well received by consumers due to advantages of easy operation and high intuition, and gradually become a main stream in the market. However, as the touch electronic product has more and more functions, the touch operation method of directly touching a screen (which is referred to as a two-dimensional (2D) touch) is unable to satisfy user's operational requirements. In recent years, a hovering electronic product is developed, which not only has the 2D sensing function, but also allows the user to perform a touch operation when the user approaches to the screen without touching the screen. Namely, the user can easily operate the hovering electronic product in a distance above the screen (which is referred to as a 3D touch) by disposing a touch object (for example, a stylus or a finger) above the screen. Therefore, compared to the conventional touch electronic products, the hovering electronic produce can further improve the operation convenience and intuition.

In most of the existing hovering electronic products, electrodes used for the 3D touch are disposed at a peripheral area, though such method has to sacrifice a wiring layout area, so that a slim border design is hard to be implemented. On the other hand, in some hovering electronic products, a part of the electrodes originally used for the 2D touch now serves for the 3D touch. However, the electrodes used for the 2D touch generally adopt a design with better sensing linearity, and the above method may decrease a touch resolution and the sensing linearity of the 2D touch. Moreover, the electrodes of the 3D touch require a higher signer or a larger sensing sensitivity to facilitate sensing the touch object located above the screen in a distance. However, if all of the signals within the touch area are increased in order to achieve the 3D touch, it is easy to cause an error in judgment due to signal saturation when the user performs the 2D touch. On the other hand, if the sensing sensitivity within the touch area is increased, the signal is easy to be influenced by noises. Therefore, according to the existing technique, the hovering electronic product with the electrodes of the 2D touch and the electrodes of the 3D touch disposed within the touch area is hard to achieve good touch quality for both of the 2D touch and the 3D touch.

SUMMARY

The invention is directed to a touch panel, in which electrodes used for two-dimensional (2D) touch and electrodes used for 3D touch are disposed in the touch area, and the touch panel has good touch quality for the 2D touch and the 3D touch.

The invention provides a touch panel having a touch area and a peripheral area adjacent to the touch area. The touch panel includes a plurality of touch elements, a plurality of hovering touch elements, a plurality of pads and a plurality of wirings. The touch elements and the hovering touch elements are at least located in the touch area and are electrically isolated to each other, where the hovering touch elements expose at least a part of the touch elements. The pads are located in the peripheral area. The touch elements and the hovering touch elements are electrically connected to the pads through the wirings respectively.

The invention provides a touch panel having a touch area and a peripheral area adjacent to the touch area. The touch panel includes a plurality of first electrodes, a plurality of second electrodes, a plurality of third electrodes, a plurality of pads and a plurality of wirings. The first electrodes, the second electrodes and the third electrodes are located in the touch area and are electrically insulated to each other, where the third electrodes expose at least a part of the first electrodes and at least a part of the second electrodes. The pads are located in the peripheral area. The first electrodes, the second electrodes and the third electrodes are electrically connected to the pads through the wirings respectively.

According to the above descriptions, in the touch panel of the invention, the hovering touch elements (the third electrodes) used for the 3D touch are disposed in the touch area, by which the problem of sacrificing a layout area of the wirings due to configuration of the electrodes used for the 3D touch in the peripheral area is mitigated. Moreover, since the electrodes used for the 3D touch and the electrodes used for the 2D touch are independent to each other, namely, the touch panel of the invention does not take a part of the electrodes used for the 2D touch to serve for the 3D touch, and the touch panel of the invention has good touch resolution and sensing sensitivity for the 2D touch. Moreover, since the touch panel of the invention configures different electrodes to implement the 2D touch and the 3D touch, performance conflict of the 2D touch and the 3D touch can be avoided, so as to achieve good touch quality of the 2D touch and the 3D touch.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1A:
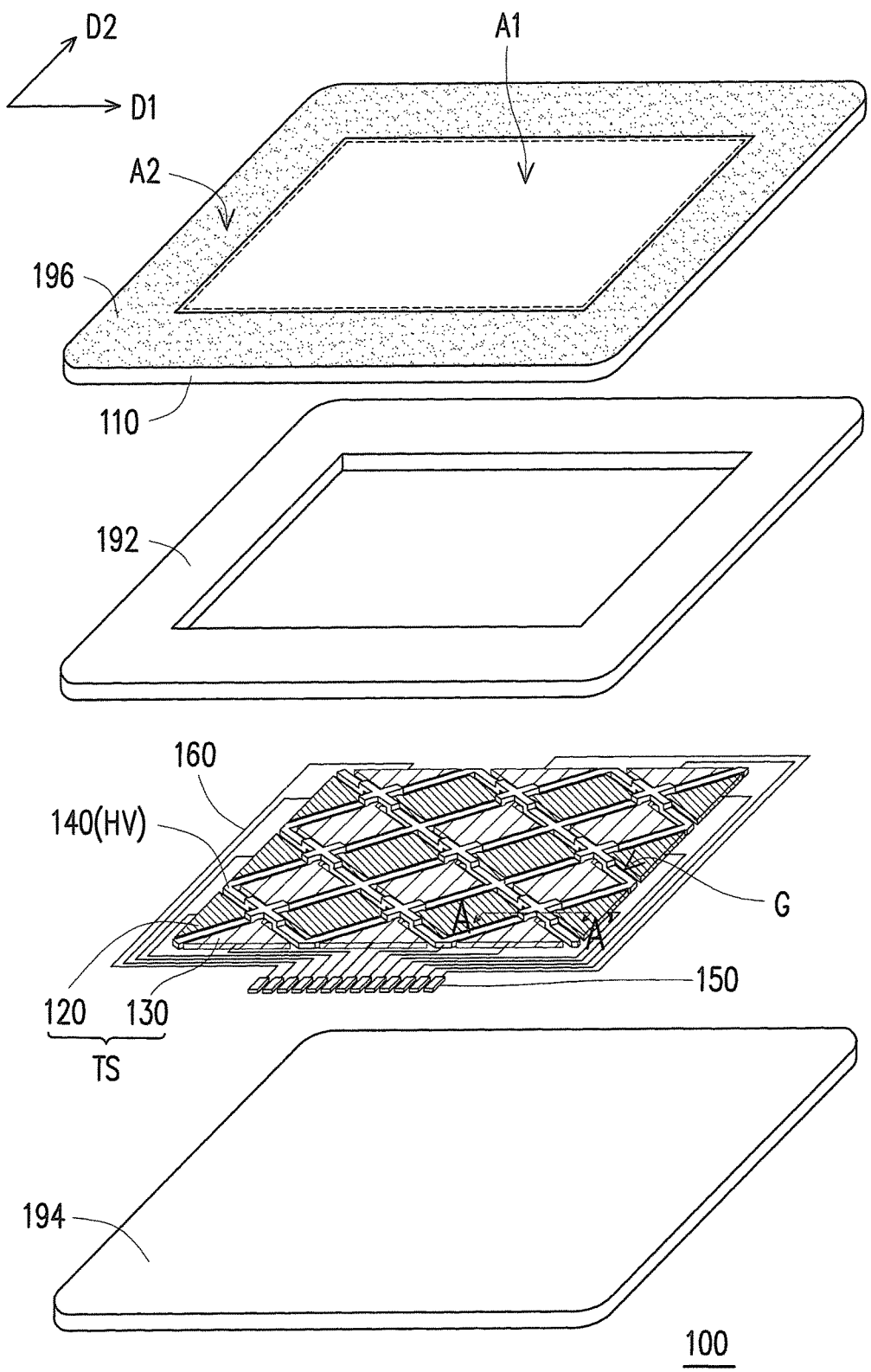
FIG. 1A is an exploded view of a touch panel according to a first embodiment of the invention.
Figure 1B:
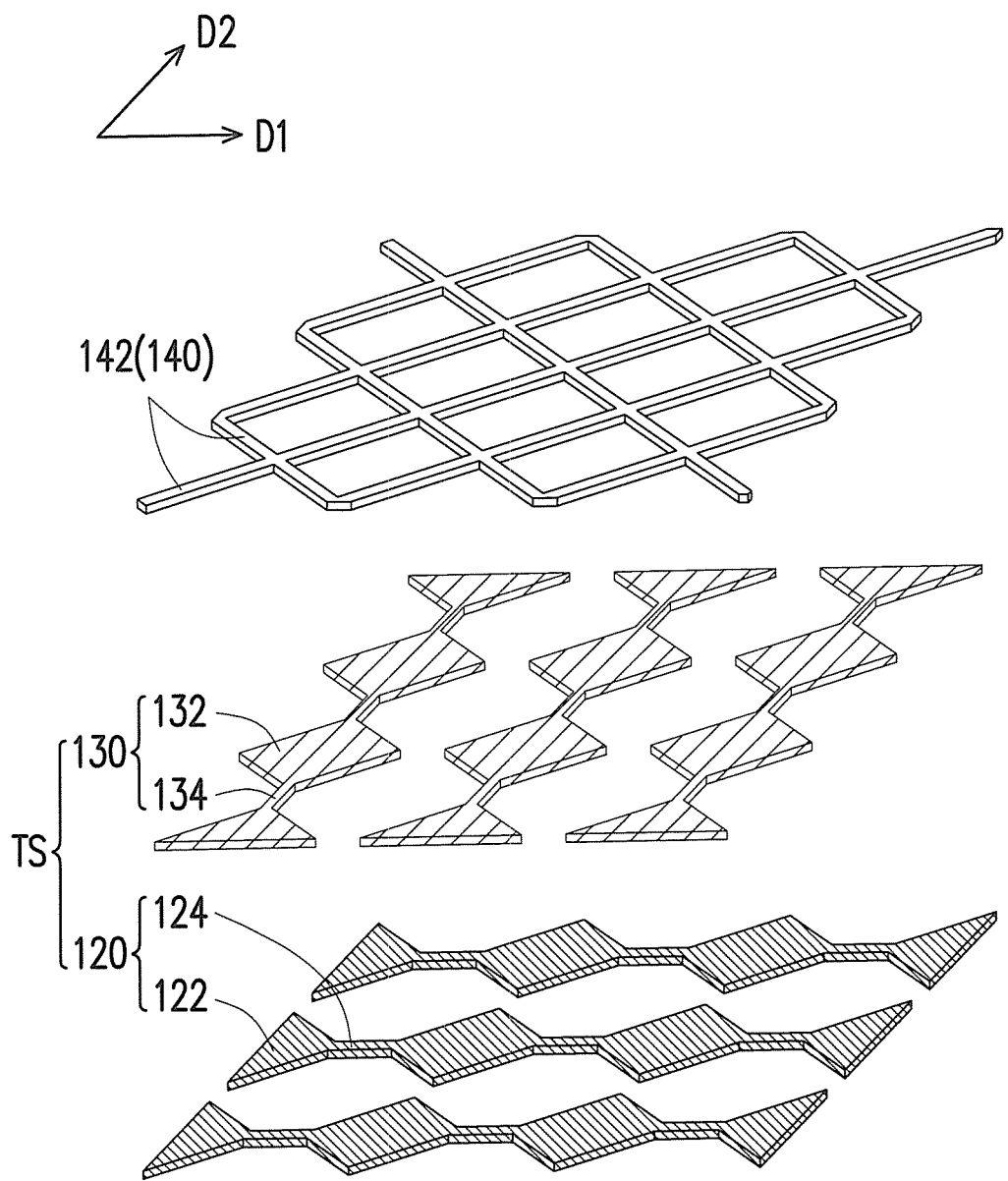
FIG. 1B is an exploded view of a first electrode, a second electrode and a third electrode in FIG. 1A.
Figure 1C:
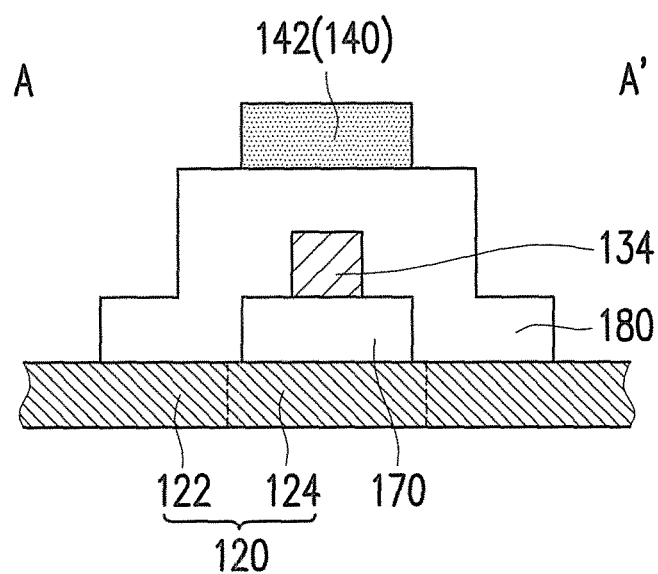
FIG. 1C is a cross-sectional view of the touch panel of FIG. 1A along a section line A-A'.
Figure 1D:
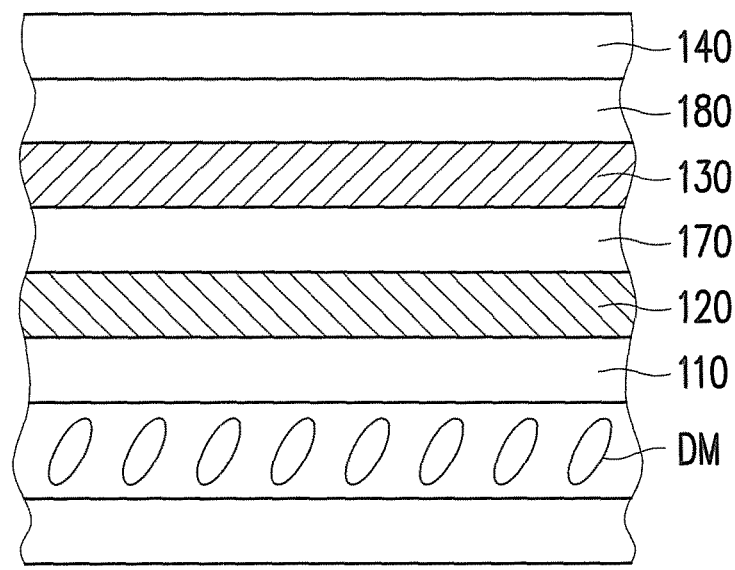
FIG. 1D-FIG. 1F are schematic diagrams of other touch panels according to the first embodiment of the invention.
Figure 1E:
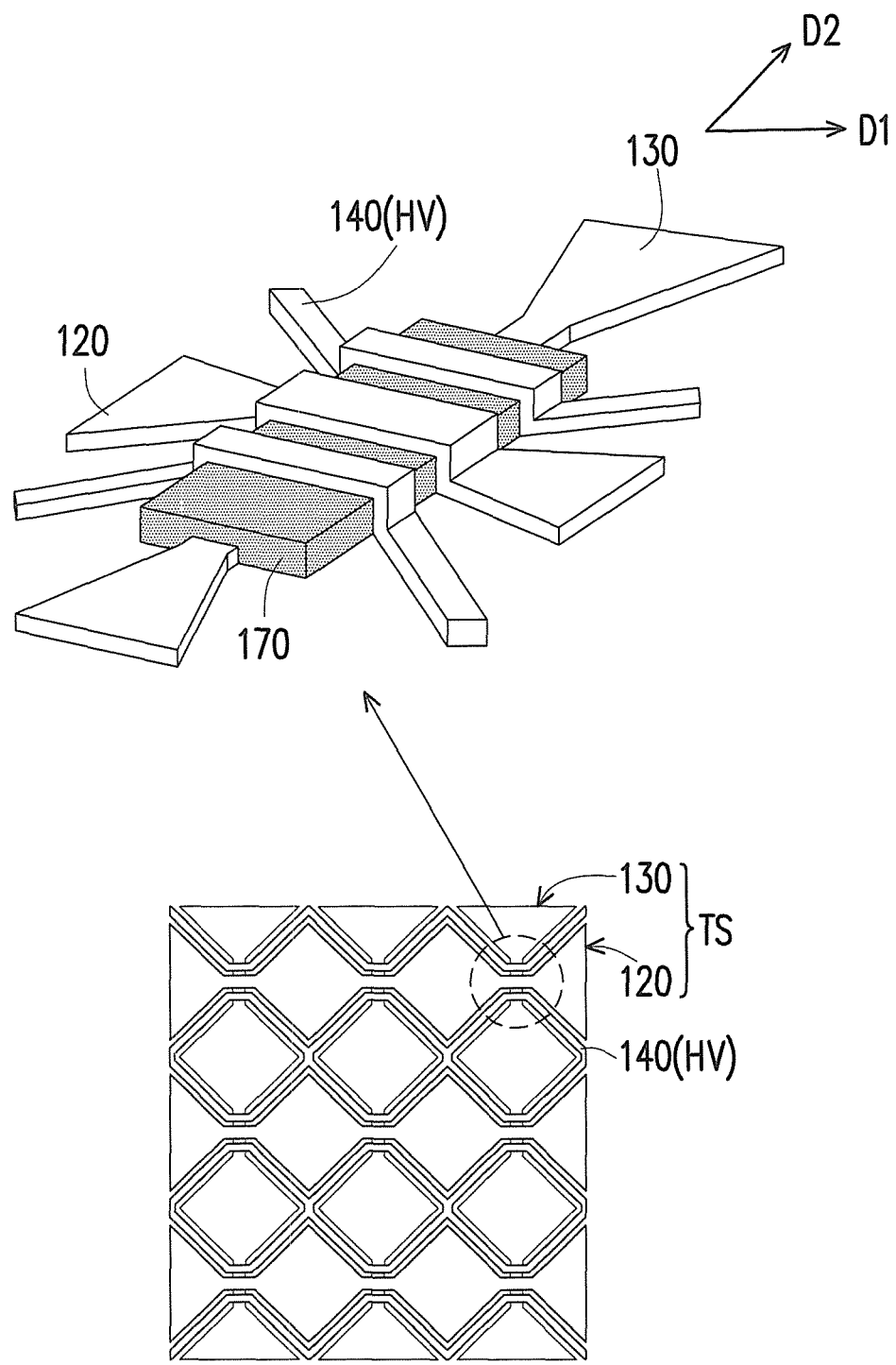
Figure 1F:
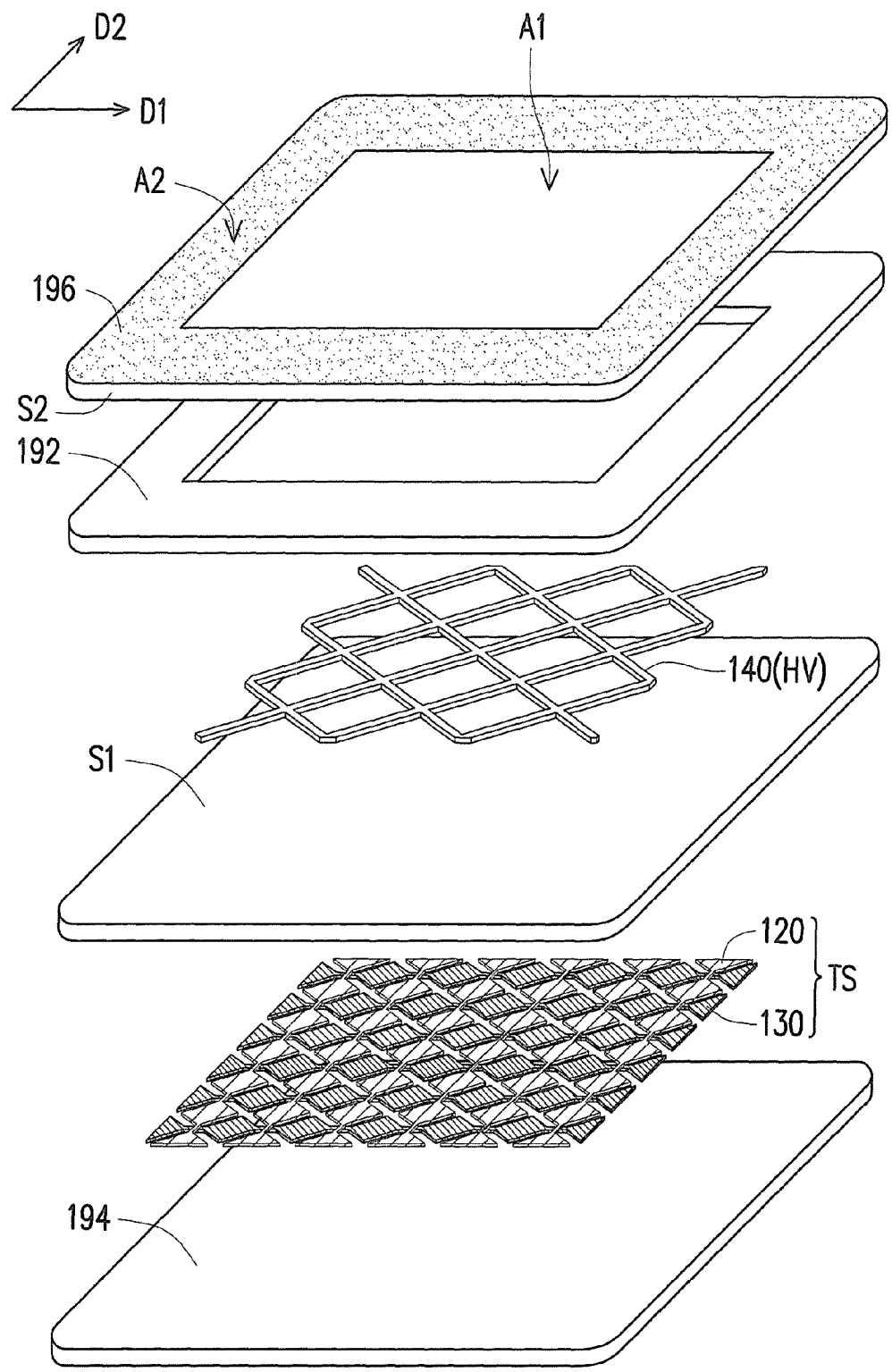

FIG. 1A is an exploded view of a touch panel according to a first embodiment of the invention. FIG. 1B is an exploded view of a first electrode, a second electrode and a third electrode in FIG. 1A. FIG. 1C is a cross-sectional view of the touch panel of FIG. 1A along a section line A-A'. FIG. 1D-FIG. 1F are schematic diagrams of other touch panels according to the first embodiment of the invention. Referring to FIG. 1A, FIG. 1B and FIG. 1C, the touch panel 100 of the present embodiment includes a plurality of touch elements TS, a plurality of hovering touch elements HV, a plurality of pads 150 and a plurality of wirings 160.

In the present embodiment, the touch panel 100 further includes a substrate 110, in which the touch elements TS, the hovering touch elements HV, the pads 150 and the wirings 160 are, for example, located at a same side of the substrate 110. Moreover, the substrate 110 has a touch area A1 and a peripheral area A2 adjacent to the touch area A1. The touch elements TS and the hovering touch elements HV are located in the touch area A1 and are electrically isolated to each other. The pads 150 are located in the peripheral area A2. The touch element TS and the hovering touch element HV are electrically connected to the pads 150 through the wirings 160.

In detail, the touch elements TS of the present embodiment, for example, include a plurality of first electrodes 120 and a plurality of second electrodes 130, and the hovering touch elements HV, for example, include a plurality of third electrodes 140, and the first electrodes 120, the second electrodes 130 and the third electrodes 140 are electrically connected to the pads 150 through the wirings 160.

Each of the first electrodes 120, for example, includes a plurality of first electrode pads 122 and a plurality of first connection lines 124, where the first connection line 124 connects two adjacent first electrode pads 122 along a first direction D1. Each of the second electrodes 130, for example, includes a plurality of second electrode pads 132 and a plurality of second connection lines 134, where the second connection line 134 crosses over the corresponding first connection line 124, and connects two adjacent second electrode pads 132 along a second direction D2. The first electrode pads 122 and the second electrode pads 132 have a plurality of gaps there between, and each of the third electrodes 140, for example, includes a plurality of third connection lines 142, and an orthogonal projection of each of the third connection lines 142 within the touch area A1 is located in the gap G, and at least crosses over one of the corresponding first connection line 124 and the second connection line 134, such that at least a part of the third connection lines 142 of each of the third electrodes 140 are electrically connected.

The first electrodes 120 and the second electrodes 130 are, for example, used for 2D touch, and the third electrodes 140 are, for example, used for 3D touch. Therefore, in order to prevent the third electrode 140 from shielding signals of the first electrodes 120 and the second electrodes 130, the third electrodes 140 expose at least a part of the first electrodes 120 and at least a part of the second electrodes 130. As shown in FIG. 1A, the third electrodes 140 of the present embodiment, for example, expose the first electrode pads 122 and the second electrode pads 132.

In the touch panel 100 of the invention, the hovering touch elements HV (the third electrodes 140) used for 3D touch are disposed in the touch area A1, which mitigates a problem of sacrificing a layout area of the wirings 160 due to configuration of the electrodes used for the 3D touch in the peripheral area A2. Moreover, since the third electrodes 140 for the 3D touch are independent to the first electrodes 120 and the second electrodes 130 for the 2D touch, namely, in the present embodiment, none of the electrodes used for the 2D touch is used for the 3D touch, so that the touch panel 100 of the present embodiment may have a good touch resolution and sensing linearity for the 2D touch. Moreover, in the touch panel 100 of the present embodiment, since different electrodes are set to implement the 2D touch and the 3D touch, the aforementioned performance conflict of the 2D touch and the 3D touch can be avoided, so as to achieve good touch quality of the 2D touch and the 3D touch.

In the present embodiment, the touch panel 100 may further include a first insulation layer 170 and a second insulation layer 180, where the first insulation layer 170 is disposed between the first electrodes 120 and the second electrodes 130 for insulation, and the second insulation layer 180 is disposed between the second electrode 130 and the third electrode 140 for insulation. A material of the first insulation layer 170 and the second insulation layer 180 can be selected from an inorganic material, an organic material or a combination thereof. The inorganic material can be silicon oxide, silicon nitride, silicon oxynitride, silicon aluminium oxide or a stacked layer of at least two of the above materials.

As shown in FIG. 1C, the first insulation layer 170 and the second insulation layer 180 can be island-shaped insulation patterns, and the first insulation layer 170 may only cover the first connection line 124, and the second insulation layer 180 may only cover an intersection of the first connection line 124 and the second connection line 134. Alternatively, as shown in FIG. 1D, the first insulation layer 170 and the second insulation layer 180 can also be a whole insulation layer, which at least covers the touch area A1 (shown in FIG. 1A). Under the structure of FIG. 1C and FIG. 1D, the substrate 110 can be a cover plate, and the cover plate is, for example, a strenghtened glass substrate, a plastic substrate or a rigid substrate with high mechanical strength. Normally, the strenghtened glass substrate is a type of safety glass processed by thermal or chemical treatment to increase its strength compared with normal glass substrate. Alternatively, the substrate 110 can also be an opposite substrate in a display. Moreover, the first electrodes 120, the second electrodes 130, the third electrodes 140, the first insulation layer 170 and the second insulation layer 180 and a display medium layer DM of the display can be located at two opposite sides of the substrate (as shown in FIG. 1D), or the first electrodes 120, the second electrodes 130, the third electrodes 140, the first insulation layer 170 and the second insulation layer 180 can also be disposed between the display medium layer DM and the substrate 110. In this way, the touch panel can be integrated with the display to form a touch display panel.

Besides the above pattern design, whether the first insulation layer 170 and the second insulation layer 180 are configured is determined according to an actual requirement. In another embodiment, as shown in FIG. 1E, the first insulation layer 170 can be set only, and the first insulation layer 170 is at least disposed between the first electrodes 120 and the second electrodes 130 and between the third electrodes 140 and the first electrodes 120 or the second electrodes 130.

On the other hand, as shown in FIG. 1F, the touch panel 100 may include a first substrate S1 and a second substrate S2 disposed opposite to the first substrate S1, where the touch elements TS are disposed on the first substrate S1, the hovering touch element HV are disposed on the second substrate S2, and the second substrate S2 is disposed at a side near the user. The first substrate S1 and the second substrate S2 are, for example, plastic substrates or glass substrates. In the present embodiment, the second substrate S2 is, for example, a cover plate, and the hovering touch element HV is, for example, located at one side of the first substrate S1 facing to the cover plate. Under the structure of FIG. 1F, the second insulation layer 180 configured in FIG. 1C and FIG. 1D can be omitted.

In another embodiment, the first substrate S1 and the second substrate S2 can be plastic substrates or glass substrates, and the touch panel 100 may further include a cover plate, where the touch elements TS are disposed on the first substrate S1, the hovering touch elements HV are disposed on the second substrate S2, and the first substrate S1, the second substrate S2 and the cover plate are, for example, bonded through an adhesion layer. Moreover, the bonded first substrate S1 is located between the touch elements TS and the hovering touch elements HV, and the second substrate S2 is located between the hovering touch elements HV and the cover plate, or the bonded second substrate S2 is located between the touch elements TS and the hovering touch elements HV, and the hovering touch elements HV is located between the second substrate S2 and the cover plate. In this way, configuration of the first insulation layer 170 and the second insulation layer 180 of FIG. 1C and FIG. 1D can be omitted.

Alternatively, in another embodiment, the first electrodes 120 and the second electrodes 130 are respectively fabricated on two opposite sides of the first substrate S1, and are then bonded to the third electrodes 140 fabricated on the second substrate S2. In this way, configuration of the first insulation layer 170 and the second insulation layer 180 of FIG. 1C and FIG. 1D can also be omitted.

Referring to FIG. 1A, the touch panel 100 further include a first shielding layer 192, and the first shielding layer 192 can be floating, grounding, or has a potential of 0, so as to shield the interference on the touch area A1 caused by the wirings 160. In detail, the first shielding layer 192 is, for example, disposed at a side of the wirings 160 near the user, and the first shielding layer 192, for example, covers the peripheral area A2 and exposes the touch area A1. For example, a material of the first shielding layer 192 is, for example, a transparent conductive material, metal, alloy or a combination thereof. The transparent conductive material is, for example, metal oxide such as indium tin oxide, indium zinc oxide, aluminium tin oxide, aluminium zinc oxide, indium germanium zinc oxide, or other suitable oxides, or a stacked layer of at least two of the above materials.

When the touch panel 100 of the present embodiment is used in collaboration with a display (not shown), the touch panel 100 of the present embodiment may further include a second shielding layer 194, and the second shielding layer 194 can be floating, grounding, or has a potential of 0, so as to shield the interference on the touch area A1 caused by signals of the display. In the present embodiment, the second shielding layer 194 may fully cover the touch area A1 and the peripheral area A2, and the wirings 160 are located between the second shielding layer 194 and the first shielding layer 192. Moreover, in order to mitigate shielding image beams come from the display, a material of the second shielding layer 194 is, preferably a transparent conductive material such as indium tin oxide, indium zinc oxide, aluminium tin oxide, aluminium zinc oxide, indium germanium zinc oxide, or other suitable oxides, or a stacked layer of at least two of the above materials.

Moreover, when the substrate 110 serves as the cover plate, the touch panel 100 may further include a decoration layer 196, which is disposed on a touch surface of the substrate 110 or on a surface opposite to the touch surface. Moreover, the decoration layer 196 exposes the touch area A1, and covers the peripheral area A2, so as to decrease a chance that the user views the wirings 160 of the touch panel. In the present embodiment, the decoration layer 196 is disposed on the substrate 110, for example, between the first shielding layer 192 and the substrate 110, or on the surface of the substrate 110 opposite to the first shielding layer 192.

Figure 2A:
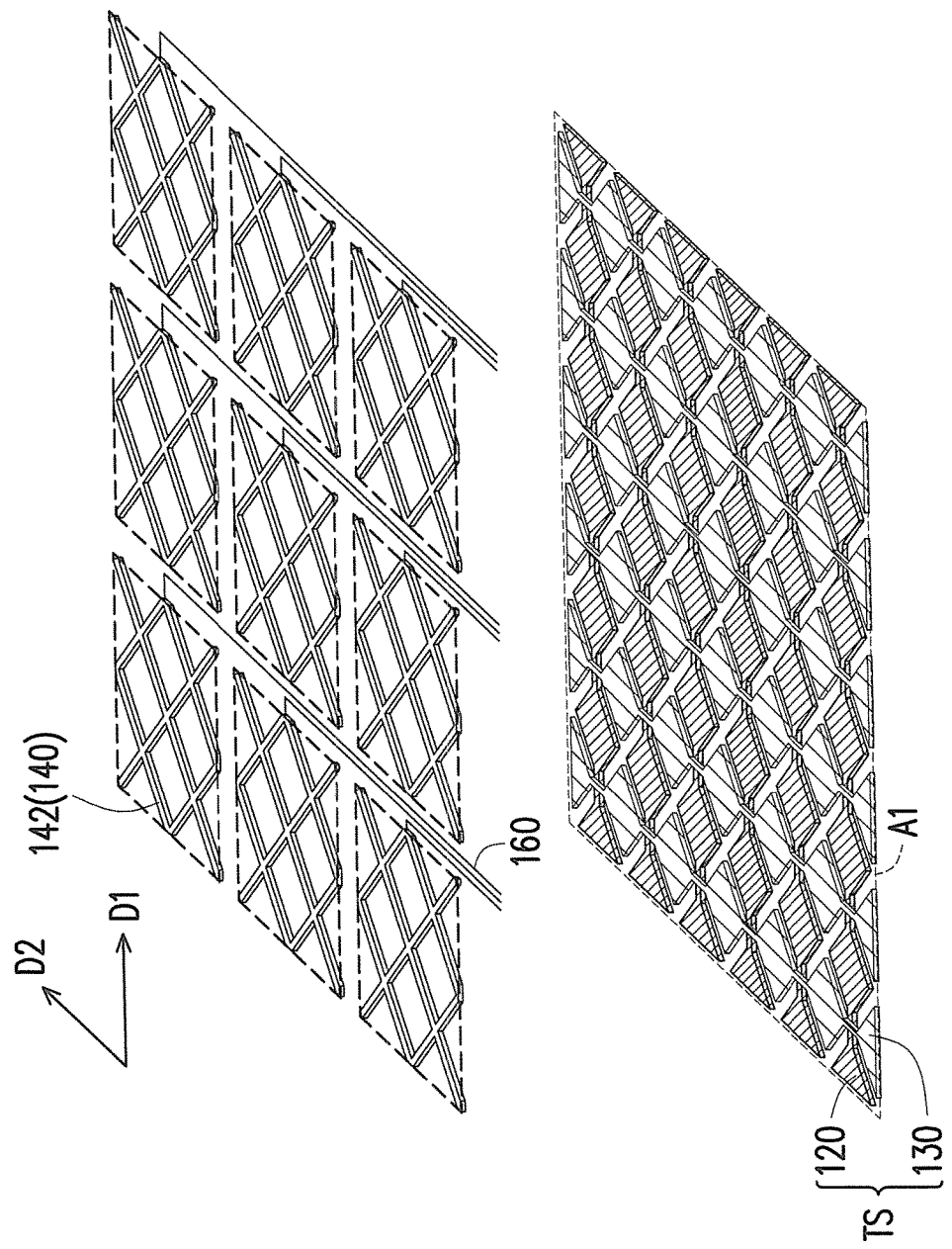
FIG. 2A illustrates a structure of a touch panel that detects a 3D touch through a self-capacitance method according to a first embodiment of the invention.
Figure 2B:
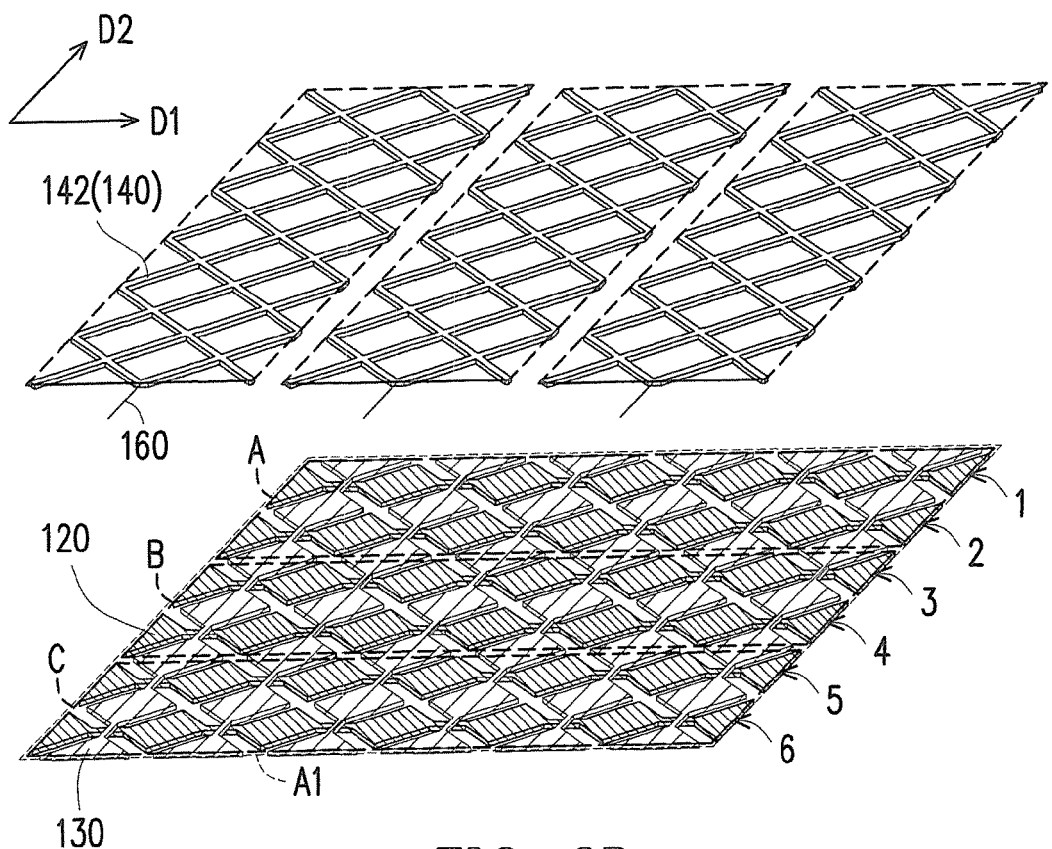
FIG. 2B illustrates a structure of a touch panel that detects a 3D touch through a mutual capacitance method of according to the first embodiment of the invention.
Figure 2C:
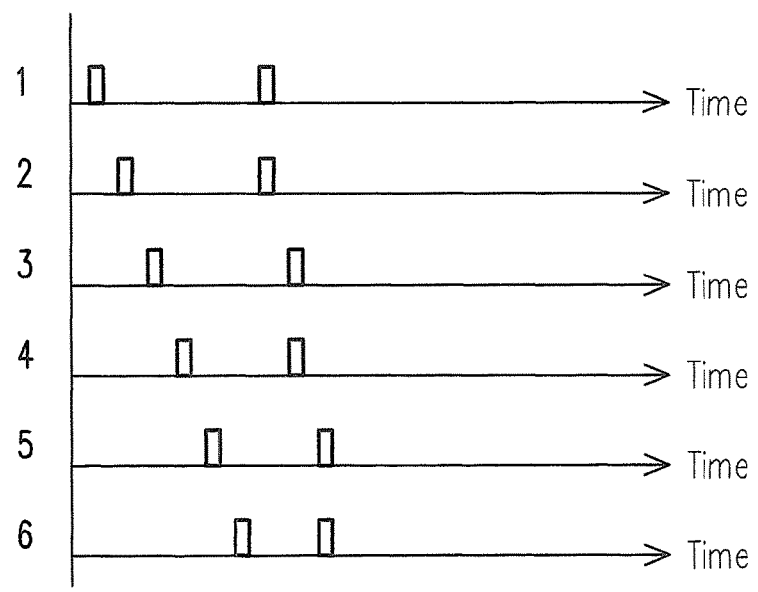
FIG. 2C is a schematic diagram of time-division driving adopted by the structure of FIG. 2B.

The touch panel of the present embodiment may determine the 3D touch through a self-capacitance or mutual capacitance method. FIG. 2A-FIG. 2C illustrate structures and a driving method of the touch panel 100 of FIG. 1A that performs the 3D touch through the self-capacitance or mutual capacitance method. FIG. 2A illustrates a structure of the touch panel that detects the 3D touch through the self-capacitance method according to a first embodiment of the invention, and FIG. 2B illustrates a structure of the touch panel that detects the 3D touch through the mutual capacitance method according to the first embodiment of the invention, and FIG. 2C is a schematic diagram of time-division driving adopted by the structure of FIG. 2B. In order to clearly illustrate the first electrodes 120, the second electrodes 130 and the third electrodes 140, the substrate 110, the pads 150, the first shielding layer 192, the second shielding layer 194 and the decoration layer 196 in FIG. 1A are not illustrated in FIG. 2A and FIG. 2B.

Referring to FIG. 2A, in case that the hovering touch elements HV (the third electrodes 140) perform the 3D touch through the self-capacitance method, each of the third electrodes 140 is used for both driving and sensing. Moreover, the third electrodes 140 are, for example, distributed in the touch area A1 in array for planar sensing, where a size of each of the third electrodes 140 in the touch area A1 can be determined according to an actual design requirement. In other embodiment, the third electrodes 140 along a first direction D1 can be connected in series to increase a sensing amount for the 3D touch (now, the third electrodes 140 are disposed in parallel to the first electrodes 120). Alternatively, the third electrodes 140 along a second direction D2 can be connected in series to increase a sensing amount for the 3D touch (now, the third electrodes 140 are disposed in parallel to the second electrodes 130).

It should be noticed that a distribution pattern of the third electrodes 140 or positions of the third electrodes 140 in the touch area A1 may influence a layout pattern of the wirings 160. In FIG. 2A, the wirings 160, for example, cross over the first electrodes 120 and the third electrodes 130 and are connected to the pads that are not illustrated. Under such layout pattern, by disposing the third electrodes 140 and the wirings 160 connected thereto on the whole second insulation layer 180 as shown in FIG. 1D, or disposing the third electrodes 140 and the wirings 160 connected thereto on the second substrate S2 as shown in FIG. 1F, the wirings 160 can be electrically insulated to the first electrodes 120 and the second electrodes 130 over which the wirings 160 cross.

Under the self-capacitance structure, the 2D touch and the 3D touch can be simultaneously driven, or driven in time-division, or a switch is used to implement a mode switch between the 2D touch and the 3D touch. The so-called simultaneously driving refers to a situation that signals are simultaneously input to driving electrodes (for example, the first electrodes 120) used for the 2D touch and the third electrodes 140 used for the 3D touch, and the time-division driving refers to that the signals input to the first electrodes 120 and the third electrodes 140 have a time difference, i.e. the third electrodes 140 and the first electrodes 120 are driven in tandem. Moreover, since most of the touch operations are 2D touch operations, the mode switch between the 2D touch and the 3D touch can be implemented through a switch. For example, a first mode, a second mode and a third mode can be set, and in the first mode, only the 2D touch can be performed; in the second mode, only the 3D touch can be performed; and in the third mode, both of the 2D touch and the 3D touch can be performed (simultaneously driving or time-division driving).

Referring to FIG. 2B, under the structure that the hovering touch elements HV (the third electrodes 140) implement the 3D touch through the mutual capacitance method, the first electrodes 120 originally serving as driving electrodes of the 2D touch can also serve as driving electrodes of the 3D touch, such that the third electrodes 140 are, for example, perpendicular to the first electrodes 120, i.e. disposed in parallel to the second electrodes 130. Since the 2D touch also adopts the mutual capacitance method to determine a touch operation, under the mutual capacitance structure, by determining a difference of capacitance effects generated when a touch object hovers above or touches the touch panel, it is determined whether the touch object hovers above the touch panel or touches the touch panel, so as to provide different functions.

Since the 3D touch does not require a high sensing linearity, the first electrodes 120 can be, for example, divided into 3 regions A, B, C as shown in FIG. 2B according to the number of regions of the third electrodes 140. When the first electrodes 120 are driven, the first electrodes 120 in the same region are simultaneously provided with the same signals. Further, under the mutual capacitance structure, the 2D touch and the 3D touch can be driven in time-division, or a switch is used to implement the mode switch between the 2D touch and the 3D touch. In case of the time-division driving, as shown in FIG. 2C, the $1^{st}$ to the $6^{th}$ first electrodes 120 shown in FIG. 2B (the first 1, the second 2, the third 3, the fourth 4, the fifth 5 and the sixth 6 shown in FIG. 2B) are, for example, sequentially input with 2D touch signals. Then, the two first electrodes 120 (the first 1 and the second 2) in the region A are simultaneously input with 3D touch signals. Thereafter, the two first electrodes 120 (the third 3 and the fourth 4) in the region B and the two first electrodes 120 (the fifth 5 and the sixth 6) in the region C are sequentially input with 3D touch signals.

In FIG. 2A and FIG. 2B, in case that the 2D touch and the 3D touch are simultaneously performed, when the touch object (stylus or finger) approaches to the touch panel without touching the touch panel, a sensing amount of the second electrodes 130 that serves as the sensing electrodes of the 2D touch is not greater than a predetermined value, and now the touch panel does not execute a predetermined function of the 2D touch, though the third electrodes 140 may sense a capacitance variation and determine that the touch object hovers above the touch panel, and accordingly execute a function of the hovering touch. On the other hand, when the touch object touches the touch panel, both of the second electrodes 130 and the third electrodes 140 have a sensing amount. Therefore, the third electrodes 140 can be set to a pre-start function of the second electrodes 130. Moreover, since the 3D touch is not easy to be influenced by environmental factors (for example, moisture) compared to coordinate determination of the 2D touch, the third electrodes 140 may assist the coordinate determination of the second electrodes 130, so as to mitigate wrong determinations caused by environmental factors.

Figure 2D:
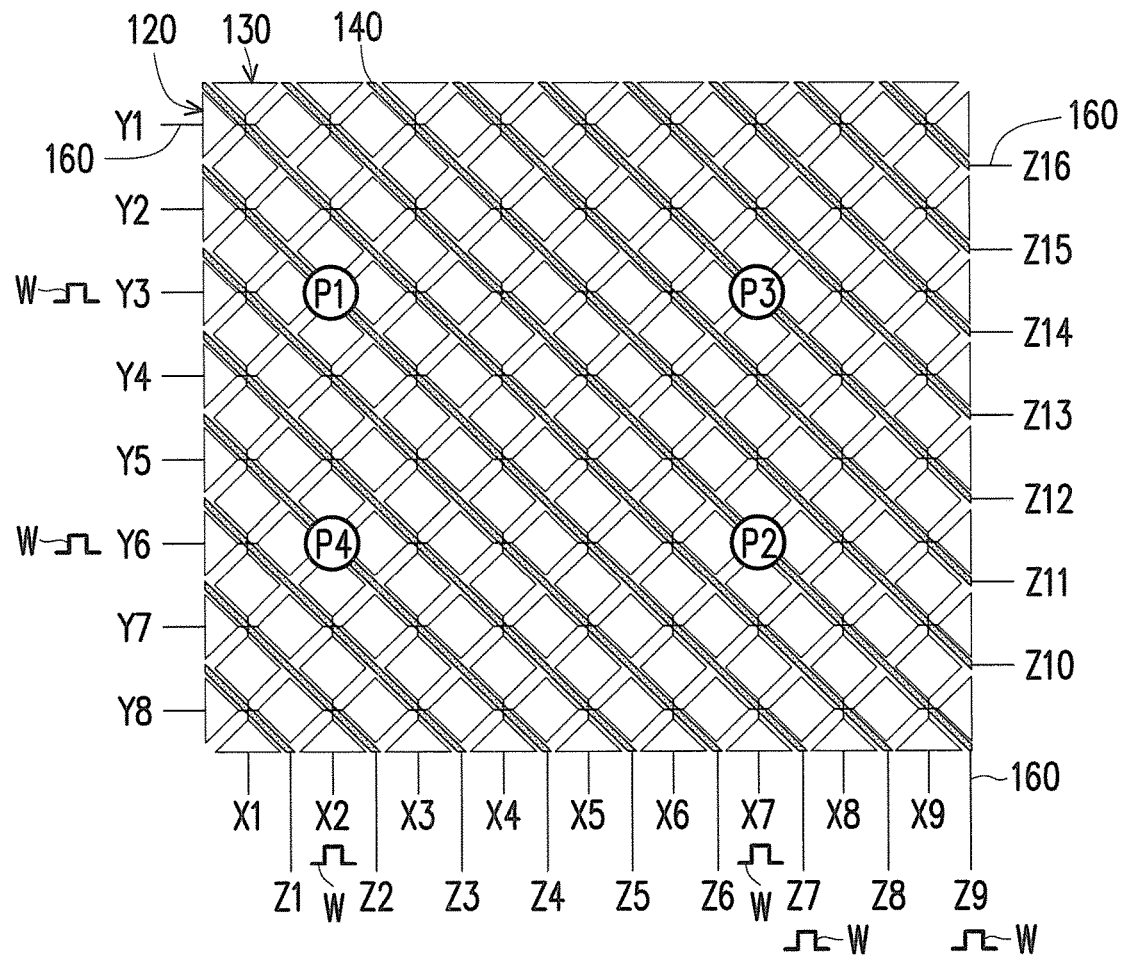
FIG. 2D illustrates a structure of a touch panel that detects a 2D touch through a self-capacitance method according to the first embodiment of the invention.

FIG. 2D illustrates a structure of the touch panel that detects the 2D touch through the self-capacitance method according to the first embodiment of the invention. Referring to FIG. 2D, the touch panel performing the 2D through the self-capacitance method may adopt the touch panel of FIG. 1C, FIG. 1D, FIG. 1E or FIG. 1F, and in FIG. 2D, the aforementioned substrate 110, the pads 150, the first shielding layer 192, the second shielding layer 194 and the decoration layer 196 are not illustrated. For simplicity's sake, the wirings 160 in FIG. 2D respectively have a referential number, where the $Y1^{th}$ to $Y8^{th}$ wirings 160 are respectively connected to the first electrodes 120, the $X1^{th}$ to $X9^{th}$ wirings 160 are respectively connected to the second electrodes 130, and the $Z1^{th}$ to $Z16^{th}$ wirings 160 are respectively connected to the third electrodes 140.

In the structure design of FIG. 2D, the first electrodes 120, the second electrodes 130 and the third electrodes 140 can be located in different levels, and are electrically insulated from each other through insulators (for example, organic or inorganic insulators), so as to avoid short-circuit. Alternatively, the first electrodes 120 and the second electrodes 130 can be located in a same level, and the third electrodes 140 and the first electrodes 120 (or the second electrodes 130) can be located in different levels. Alternatively, the first electrodes 120, the second electrodes 130 and the third electrodes 140 can be located in the same level, and are electrically insulated from each other at intersections by using insulators (for example, organic or inorganic insulators).

When the touch detection is performed, for example, it is set that a progressive scan is first performed on the first electrodes 120, and then the progressive scan is performed on the second electrodes 130, and finally the progressive scan is performed on the third electrodes 140. The first electrodes 120, the second electrodes 130 and the third electrodes 140 can be covered by an insulator, for example, a cover plate, and a touch operation of touching an outer surface of the insulator can be detected. Alternatively, the first electrodes 120, the second electrodes 130 and the third electrodes 140 may detect a hovering touch operation. During the touch operation, for example, when the user touches positions P1 and P2 of the touch panel, the $Y3^{th}$ and $Y6^{th}$ wirings 160 and the $X2^{th}$ and $X7^{th}$ wirings 160 respectively receive a touch signal W. Now, besides that the system reads the positions P1 and P2 touched by the user, the system further misjudges that the positions P3 and P4 are also touched. However, after the progressive scan is performed on the third electrodes 140, only the $Z7^{th}$ and $Z9^{th}$ wirings 160 respectively receive the touch signal W. In this way, according to the touch signal W received by the first electrodes 120, the second electrodes 130 and the third electrodes 140, the system may calculate the actually touched positions P1 and P2, so as to mitigate misjudgement of the 2D touch caused by the self-capacitance driving method. Moreover, when the 2D touch is detected according to the self-capacitance method, one of the first electrodes 120 and the second electrodes 130 in the touch elements TS can be set to detect the 2D touch. Moreover, a pattern design of the first electrodes 120 and the second electrodes 130 can be determined according to an actual design requirement, which is not limited to the pattern design of FIG. 2D.

Figure 3:
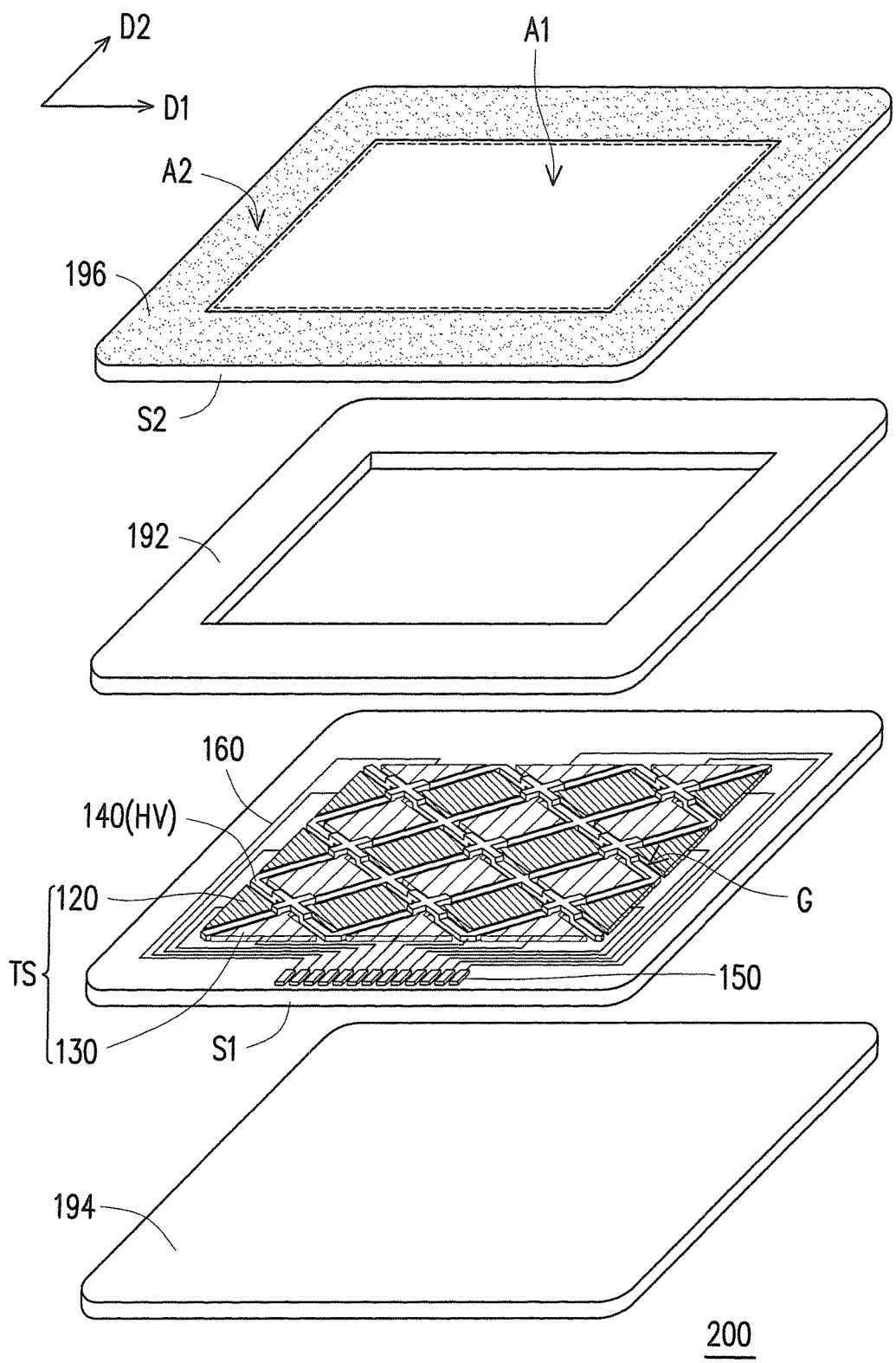
FIG. 3 is an exploded view of a touch panel according to a second embodiment of the invention.

FIG. 3 is an exploded view of a touch panel according to a second embodiment of the invention. Referring to FIG. 3, the structure of the touch panel 200 of the present embodiment is similar to that of the touch panel 100 of FIG. 1A, and the first electrodes 120, the second electrodes 130 and the third electrodes 140 of the touch panel 200 may adopt the structures and driving method of FIG. 2A, FIG. 2B and FIG. 2D, where the same film layers are denoted by the same referential numbers, and the corresponding materials, configuration method, driving method and effects are not repeated. A main difference between the touch panel 200 and the touch panel 100 is that the touch panel 200 includes a first substrate S1 and a second substrate S2 disposed opposite to the first substrate S1, where the touch elements TS and the hovering touch elements HV are disposed on the first substrate S1, and are located between the second substrate S2 and the first substrate S1, and the second substrate S2 is located at a side near the user. In another embodiment, the touch elements TS are disposed on the first substrate S1, and the hovering touch elements HV are disposed on the second substrate S2, and then the first substrate S1 and the second substrate S2 are bonded, where the bonded touch elements TS and the hovering touch elements HV are located between the second substrate S2 and the first substrate S1.

The first substrate S1 and the second substrate S2 are, for example, respectively a plastic substrate or a glass substrate. In the present embodiment, the second substrate S2 is, for example, a cover plate, and the cover plate can be a glass substrate with enhanced characteristics, a plastic substrate or other rigid substrate with high mechanical strength, so as to cover, protect and decorate the corresponding device. Moreover, the touch panel 200 of the present embodiment may further include the aforementioned first shielding layer 192, the second shielding layer 194 and the decoration layer 196, and the configuration relationship, materials and effects of the above three layers may refer to corresponding descriptions of FIG. 1A, which are not repeated.

Figure 4A:
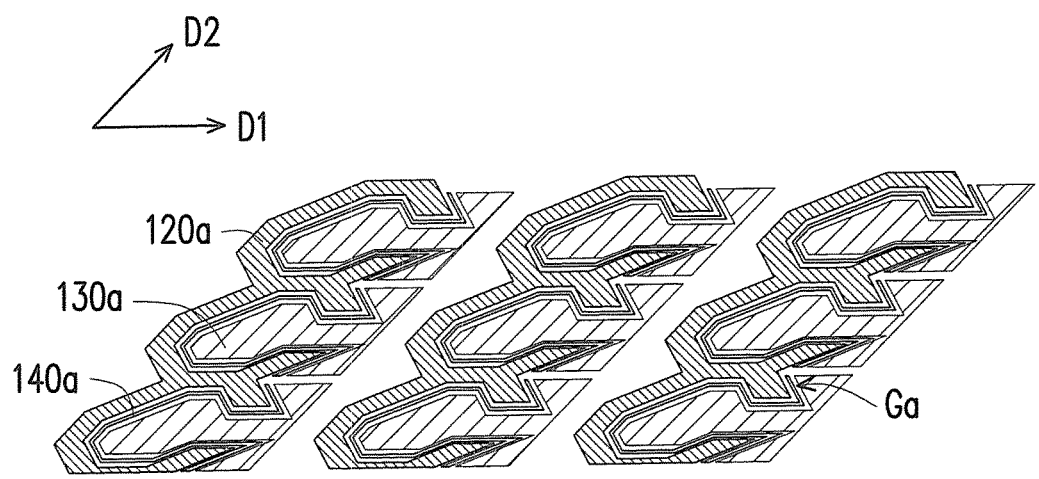
FIG. 4A illustrates another implementation of first electrodes, second electrodes and third electrodes of the second embodiment.
Figure 4B:
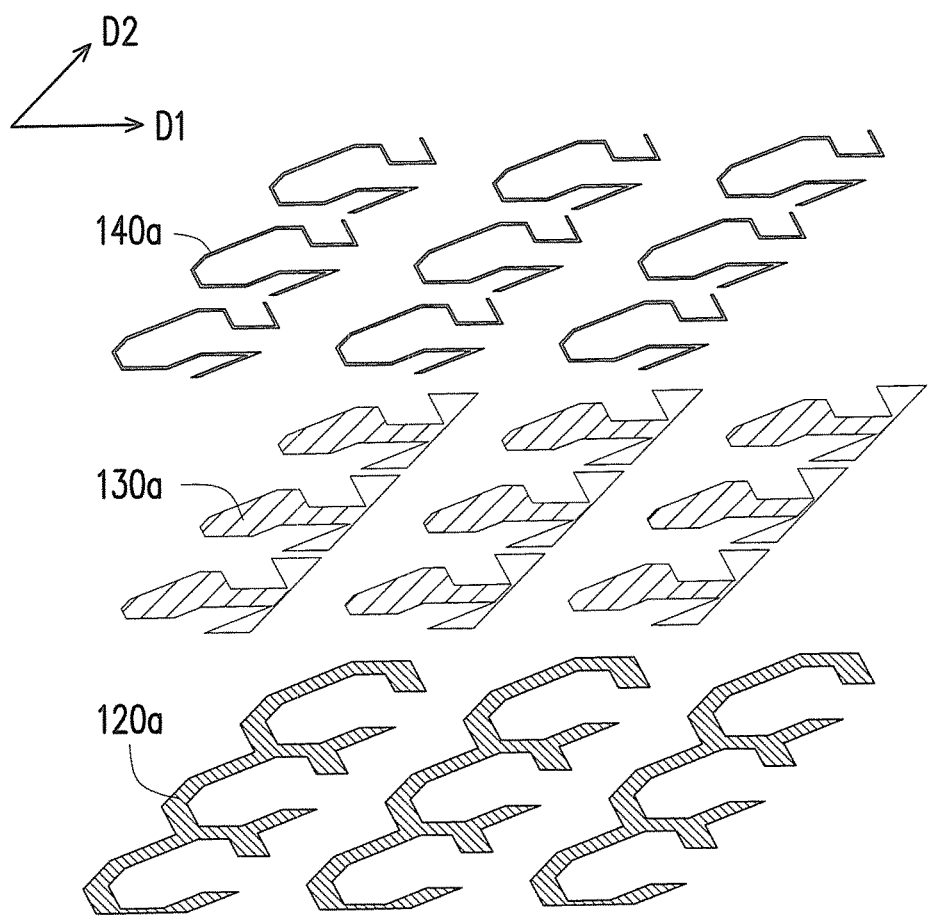
FIG. 4B is an exploded view of the first electrodes, the second electrodes and the third electrodes of FIG. 4A.

Although electrode pads and connection lines are adopted to describe the first electrodes 120 and the second electrodes 130 of the aforementioned embodiment, the shapes of the first electrodes, the second electrodes and/or the third electrodes are not limited thereto. FIG. 4A illustrates another implementation of the first electrodes, the second electrodes and the third electrodes of the second embodiment, and FIG. 4B is an exploded view of the first electrodes, the second electrodes and the third electrodes of FIG. 4A. Referring to FIG. 4A and FIG. 4B, under the structures of the touch panels 100 and 200 of FIG. 1A and FIG. 3, the first electrodes 120, the second electrodes 130 and the third electrodes 140 of FIG. 1A and FIG. 3 can be replaced by the first electrodes 120a, the second electrodes 130a and the third electrodes 140a of FIG. 4A and FIG. 4B. As shown in FIG. 4A and FIG. 4B, each of the first electrodes 120a can be an outer ring electrode extending along the first direction D1, and each of the second electrodes 130a can be an inner ring electrode, where a plurality of the inner ring electrodes are correspondingly disposed in one of the outer ring electrodes, and the outer ring electrodes and the inner ring electrodes have a plurality of gaps Ga there between, and the third electrodes 140a are located in the gaps Ga and extend along the gaps Ga, where an extending direction of each of the third electrodes 140a is parallel to the first direction D1.

Besides a difference in pattern designs, the difference between the first electrodes 120a, the second electrodes 130a and the third electrodes 140a and the first electrodes 120, the second electrodes 130 and the third electrodes 140 of FIG. 1A and FIG. 3 is that there is non cross line between the first electrodes 120a, the second electrodes 130a and the third electrodes 140a, i.e. the electrodes are not overlapped to each other. Therefore, compared to the embodiment of FIG. 1A and FIG. 3 that at least two fabrication processes are used to fabricate the first electrodes 120, the second electrodes 130 and the third electrodes 140, fabrication of the first electrodes 120a, the second electrodes 130a and the third electrodes 140a can be completed through one fabrication process, so as to decrease time and cost required for the fabrication process.

Figure 4C:
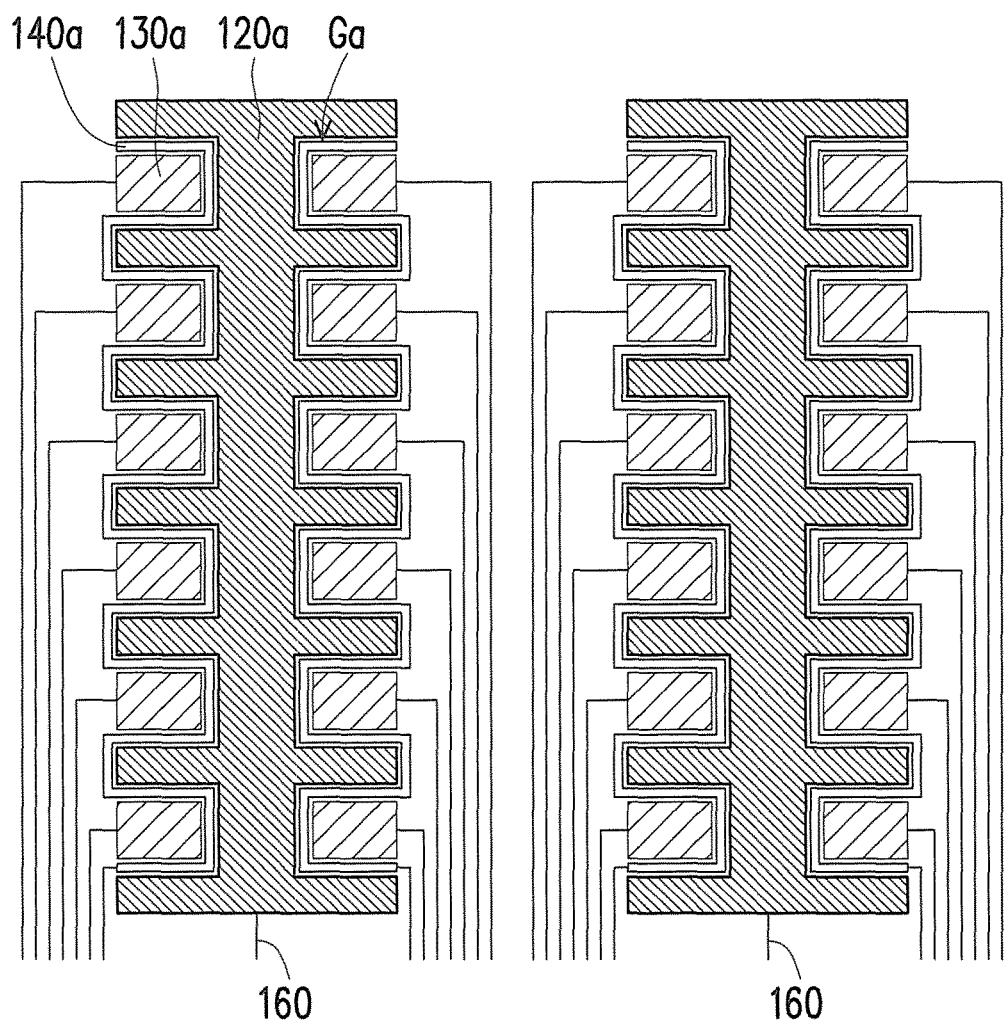
FIG. 4C and FIG. 4D illustrate other implementations of the first electrodes, the second electrodes and the third electrodes of the second embodiment.
Figure 4D:
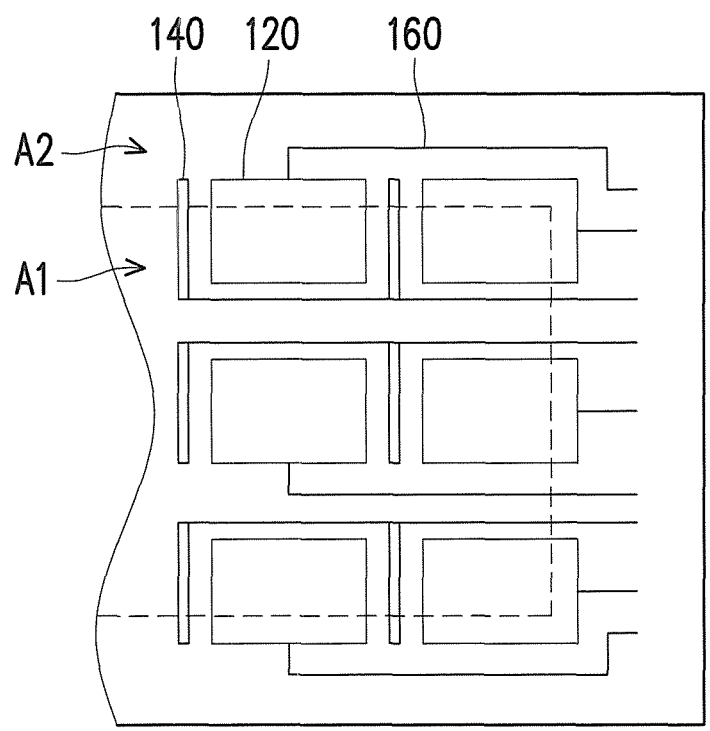

It should be noticed that in case of none cross lines, the pattern design of the first electrode 120a, the second electrode 130a and the third electrode 140a may also have other implementations. FIG. 4C and FIG. 4D illustrate other implementations of the first electrodes, the second electrodes and the third electrodes of the second embodiment. Referring to FIG. 4C, the first electrodes 120a and the second electrodes 130a are not overlapped to each other, and the first electrodes 120a and the second electrodes 130a have a plurality of gaps Ga there between, and the third electrodes 140a are located in the gaps Ga and extend along the gaps Ga.

Moreover, in case of the 2D touch performed according to the self-capacitance method, only one of the first electrodes 120 and the second electrodes 130 can be set to implement the 2D touch, for example, as shown in FIG. 4D, only the first electrodes 120 are used to implement the 2D touch. Moreover, the pattern design of the first electrodes 120 or the second electrodes 130 can be determined according to an actual design requirement, which is not limited to the pattern design of FIG. 4D.

Figure 5A:
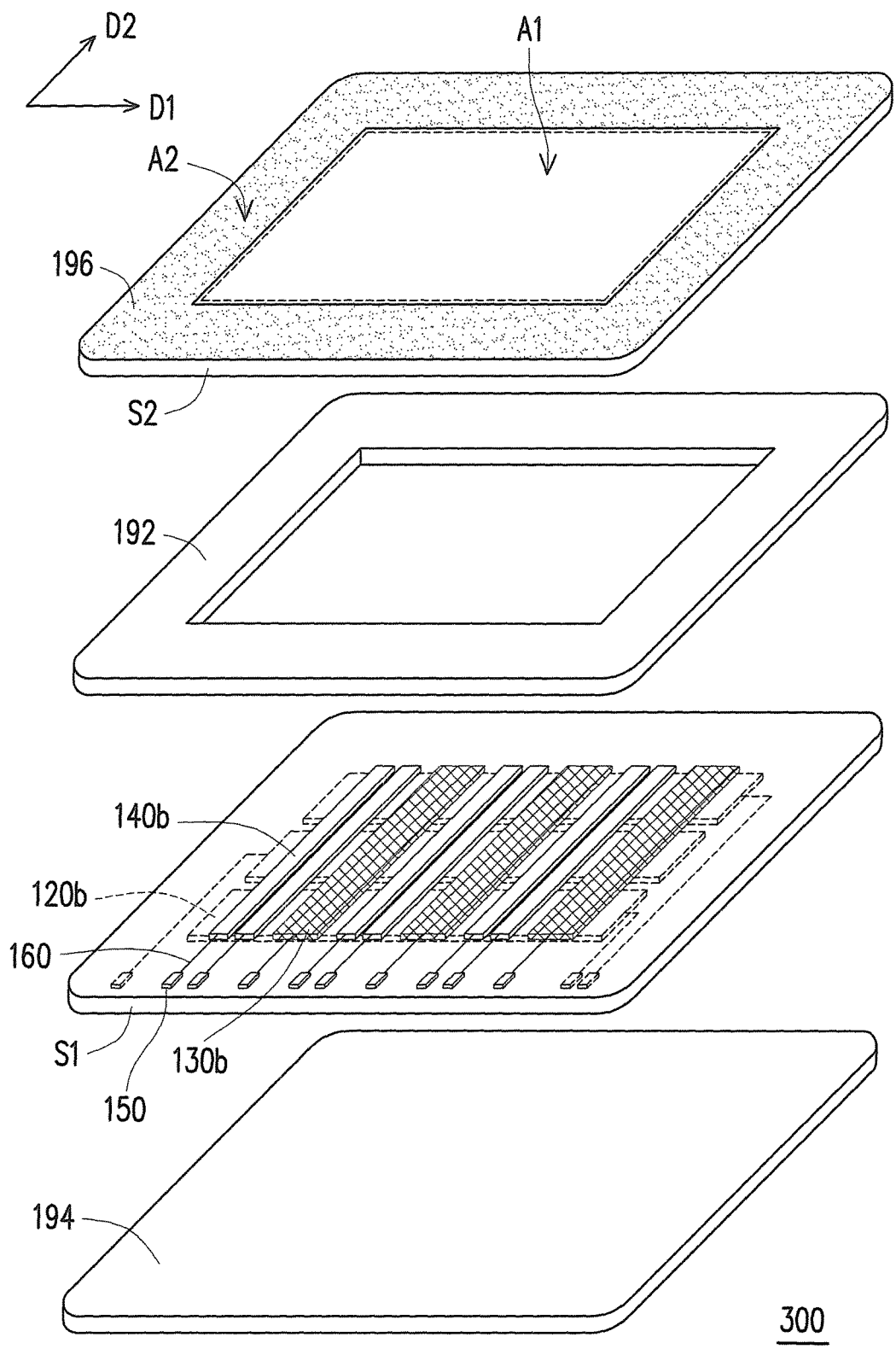
FIG. 5A is an exploded view of a touch panel according to a third embodiment of the invention.
Figure 5B:
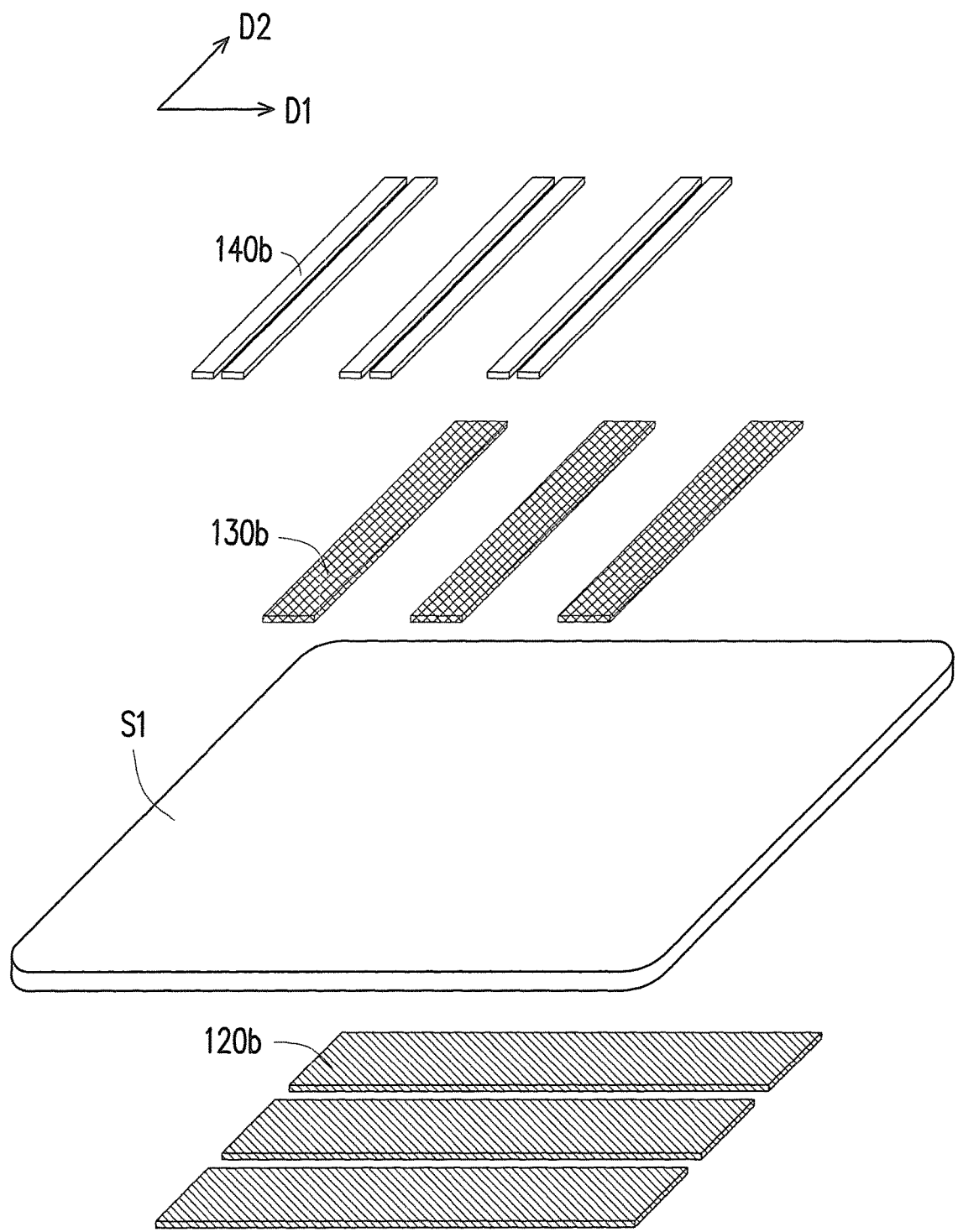
FIG. 5B is an exploded view of first electrodes, second electrodes and third electrodes of FIG. 5A.

FIG. 5A is an exploded view of a touch panel according to a third embodiment of the invention. FIG. 5B is an exploded view of first electrodes, second electrodes and third electrodes of FIG. 5A. Referring to FIG. 5A and FIG. 5B, the touch panel 300 of the present embodiment has a similar structure with that of the touch panel 200 of FIG. 3, and the first electrodes 120b, the second electrodes 130b and the third electrodes 140b of the touch panel 300 may adopt the structures and driving method shown in FIG. 2A and FIG. 2B, where the same film layers are denoted by the same referential numbers, and the corresponding materials, configuration method, driving method and effects are not repeated. A main difference between the touch panel 300 and the touch panel 200 lies in a relative configuration relationship and pattern designs of the first electrodes 120b, the second electrodes 130b, the third electrodes 140b and the first substrate S1 and the second substrate S2.

In detail, the second electrodes 130b and the first electrodes 120b of the present embodiment are respectively disposed on two opposite sides of the first substrate S1, and the third electrodes 140b are disposed on the first substrate S1 at a side the same with that of the second electrodes 130b or the first electrodes 120b. Considering touch sensitivity of the 3D touch, the third electrodes are preferably located on the side of the substrate 110 near the user. In the present embodiment, the third electrodes 140b are, for example, located on the first substrate S1 at a same side with that of the second electrodes 130b, and located on the substrate 110 at a side opposite to that of the first electrodes 120b.

Moreover, each of the first electrodes 120b is a first bar-shape electrode extending along the first direction D1, and each of the second electrodes 130b is a second bar-shape electrode extending along the second direction D2, and each of the third electrodes 140b is located between two adjacent second electrodes 130b. In the present embodiment, each of the third electrodes 140b is a third bar-shape electrode extending along the second direction D2, though the shape and the extending direction of the third electrodes 140b are not limited by the invention. For example, each of the third electrodes 140b may also include a plurality of block-shape electrodes. Alternatively, when the relative configuration relationship between the first electrodes 120b and the second electrodes 130b is reversed (the first electrodes 120b and the third electrodes 140b are located at the same side of the first substrate S1), the third electrodes 140b can also be located between two adjacent first electrodes 120b and extend along the first direction D1. Similarly, under the structure of FIG. 5A and FIG. 5B (which is referred to a structure that the electrodes at located at two opposite sides of the substrate), the pattern designs of the first electrodes 120b, the second electrodes 130b and the third electrodes 140b may also adopt the pattern designs of FIG. 1B, FIG. 1E, FIG. 2D, FIG. 4B and FIG. 4C.

In summary, in the touch panel of the invention, the third electrodes used for the 3D touch are disposed in the touch area, by which the problem of sacrificing a layout area of the wirings due to configuration of the electrodes used for the 3D touch in the peripheral area is mitigated. Moreover, since the electrodes used for the 3D touch and the electrodes used for the 2D touch are independent to each other, namely, the touch panel of the invention does not take a part of the electrodes used for the 2D touch to serve for the 3D touch, and the touch panel of the invention has good touch resolution and sensing sensitivity for the 2D touch. Moreover, since the touch panel of the invention configures different electrodes to implement the 2D touch and the 3D touch, performance conflict of the 2D touch and the 3D touch can be avoided, so as to achieve good touch quality of the 2D touch and the 3D touch.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch panel, having a touch area and a peripheral area adjacent to the touch area, the touch panel comprising:
    a plurality of touch elements, located in the touch area;
    a plurality of hovering touch elements, electrically isolated from the touch elements, and located in the touch area, wherein the touch elements comprise a plurality of first electrodes and a plurality of second electrodes, the hovering touch elements comprise a plurality of third electrodes, each of the first electrodes comprises a plurality of first electrode pads and a plurality of first connection lines, the first connection lines connect two adjacent first electrode pads in series along a first direction, each of the second electrodes comprises a plurality of second electrode pads and a plurality of second connection lines, the second connection lines cross over corresponding first connection lines to connect two adjacent second electrode pads in series along a second direction, wherein the first electrode pads and the second electrode pads have a plurality of gaps there between, each of the third electrodes comprises a plurality of third connection lines, the third connection lines are located in the gaps and not overlapped with the first electrode pads or the second electrode pads, and each of the third connection lines crosses over at least one of a corresponding first connection line or a corresponding second connection line, such that at least a part of the third connection lines of each of the third electrodes are electrically connected;
    a plurality of pads, located in the peripheral area; and
    a plurality of wirings, wherein the first electrodes, the second electrodes and the third electrodes are electrically connected to at least one corresponding pad of the plurality of pads through respective wirings of the plurality of wirings.

2. The touch panel as claimed in claim 1, wherein the third electrodes are distributed in the touch area in an array.

3. The touch panel as claimed in claim 1, further comprising a substrate, wherein the first electrodes and the second electrodes are disposed at two opposites sides of the first substrate, and the third electrodes are disposed on the first substrate at a same side as that of the second electrodes or the first electrodes.

4. The touch panel as claimed in claim 1, further comprising a first substrate and a second substrate disposed opposite to the first substrate, wherein the touch elements and the hovering touch elements are disposed on the first substrate, and are located between the second substrate and the first substrate, and the second substrate is disposed at a side near a user.

5. The touch panel as claimed in claim 1, further comprising a first substrate, a second substrate disposed opposite to the first substrate and a cover plate, wherein the cover plate and the first substrate are respectively disposed at two opposite sides of the second substrate, wherein the touch elements are disposed on the first substrate, the hovering touch elements are disposed on the second substrate, and the second substrate is located between the touch elements and the hovering touch elements, and the hovering touch elements are located between the second substrate and the cover plate.

6. The touch panel as claimed in claim 1, further comprising a substrate, wherein the first electrodes, the second electrodes and the third electrodes are located at a same side of the substrate.

7. The touch panel as claimed in claim 6, further comprising a first insulation layer, wherein the first insulation layer is at least disposed between the first electrodes and the second electrodes, and between the third electrodes and the first electrodes or the second electrodes.

8. The touch panel as claimed in claim 6, further comprising a first insulation layer and a second insulation layer, wherein the first insulation layer is disposed between the first electrodes and the second electrodes, and the second insulation layer is disposed between the second electrodes and the third electrodes.

9. The touch panel as claimed in claim 1, further comprising a first substrate and a second substrate disposed opposite to the first substrate, wherein the touch elements are disposed on the first substrate, and the hovering touch elements are disposed on the second substrate, and the second substrate is disposed at a side near a user.

10. The touch panel as claimed in claim 9, wherein the first electrodes and the second electrodes are disposed at a same side of the first substrate.

11. The touch panel as claimed in claim 1, further comprising a substrate, wherein the touch elements and the hovering touch elements are disposed at a same side of the substrate.

12. The touch panel as claimed in claim 11, wherein the first substrate is a substrate of a display.

13. The touch panel as claimed in claim 1, further comprising a first substrate and a second substrate disposed opposite to the first substrate, wherein the touch elements are disposed on the first substrate, the hovering touch elements are disposed on the second substrate, and the second substrate is disposed at a side near a user.

14. The touch panel as claimed in claim 13, wherein the first substrate is a substrate of a display.

15. The touch panel as claimed in claim 13, wherein the first substrate and the second substrate are respectively a plastic substrate and a glass substrate.

16. The touch panel as claimed in claim 13, further comprising a cover plate, and the cover plate is disposed at a side of the second substrate opposite to the first substrate.

17. The touch panel as claimed in claim 13, wherein the second substrate is a cover plate, the cover plate is a strengthened glass substrate, a plastic substrate or a rigid substrate, and the hovering touch elements are located at a side of the cover plate facing the first substrate.

18. The touch panel as claimed in claim 17, further comprising a decoration layer disposed at the peripheral area.

19. The touch panel as claimed in claim 1, further comprising a first shielding layer located at a side of the wirings near a user.

20. The touch panel as claimed in claim 19, wherein the first shielding layer covers the peripheral area, and exposes the touch area.

21. The touch panel as claimed in claim 19, further comprising a second shielding layer, wherein the wirings are disposed between the second shielding layer and the first shielding layer.

22. The touch panel as claimed in claim 21, wherein the second shielding layer covers the touch area and the peripheral area.

23. A touch panel, having a touch area and a peripheral area adjacent to the touch area, the touch panel comprising:
a plurality of touch elements, located in the touch area, the plurality of touch elements including a plurality of first electrode pads, a plurality of first connection lines, the first connection lines connecting adjacent first electrode pads, a plurality of second electrode pads, and a plurality of second connection lines, the second connection lines connecting adjacent second electrode pads, the second connection lines cross over adjacent first connection lines;
a plurality of hovering touch elements, electrically insulated from the touch elements, and located in the touch area, wherein the touch elements have a plurality of gaps there between, the hovering touch elements are located in the gaps, and the hovering touch elements and the touch elements are not overlapped with each other, the plurality of hovering touch elements comprising a plurality of third electrode pads, a plurality of third connection lines, the third connection lines connecting adjacent third electrode pads, the third connection lines are located in the gaps and not overlapped with the first electrode pads or the second electrode pads, and each of the third connection lines crosses over at least one of a corresponding first connection line or second connection line; and
a plurality of wirings, wherein the touch elements and the hovering touch elements are electrically connected to at least one corresponding pad of a plurality of pads through respective wirings of the plurality of wirings.

24. The touch panel as claimed in claim 23, wherein the touch elements and the hovering touch elements are located in different levels and are electrically insulated from each other.

25. The touch panel as claimed in claim 23, wherein the touch elements comprise a plurality of first electrodes and a plurality of second electrodes, the first electrodes and the second electrodes are located in a same level, and the third electrodes are located at a level different from that of the first electrodes or the second electrode.

26. The touch panel as claimed in claim 23, wherein the touch elements comprise a plurality of first electrodes and a plurality of second electrodes, the first electrodes and the second electrodes are located in different levels, and the third electrodes are located at a level the same as that of the first electrodes or the second electrode.

27. The touch panel as claimed in claim 23, wherein the touch elements and the hovering touch elements are located in a same level.

28. The touch panel as claimed in claim 23, wherein the touch elements and the hovering touch elements sequentially receive scan signals.

29. The touch panel as claimed in claim 23, wherein the touch elements comprise a plurality of first electrodes and a plurality of second electrodes, and the first electrodes and the second electrodes are not overlapped with each other.

30. A touch panel, having a touch area and a peripheral area adjacent to the touch area, the touch panel comprising:
a plurality of first electrodes, located in the touch area;
a plurality of second electrodes, electrically insulated from the first electrodes, and located in the touch area, wherein the second electrodes cross over the first electrodes;
a plurality of hovering touch electrodes, electrically insulated from the first electrodes and the second electrodes, and located in the touch area, wherein the hovering touch electrodes cross over the first electrodes, each of the hovering touch electrodes is located between two adjacent second electrodes, and the hovering touch electrodes and the second electrodes are not overlapped with each other;
a plurality of pads, located in the peripheral area; and
a plurality of wirings, wherein the first electrodes, the second electrodes and the hovering touch electrodes are electrically connected to at least one corresponding pad of the plurality of pads through respective wirings of the plurality of wirings.

31. The touch panel as claimed in claim 30, wherein each of the first electrodes is a first bar-shape electrode extending along a first direction, each of the second electrodes is a second bar-shape electrode extending along a second direction, and each of the hovering touch electrodes is a third bar-shape electrode extending along the second direction.

* * * * *